June 18, 1968 W. R. HETTRICK 3,388,409
HONEYCOMB UNCAPPING MACHINE
Filed Feb. 11, 1966 4 Sheets-Sheet 3

William R. Hettrick
INVENTOR.

BY Clarence A. O'Brien
and Harvey B. Jacobson
Attorneys

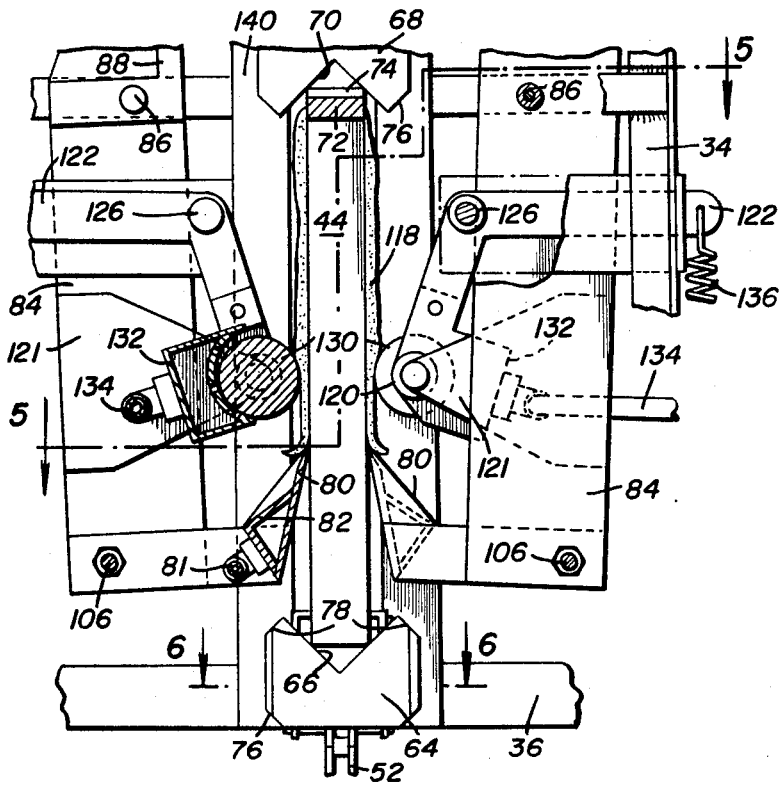
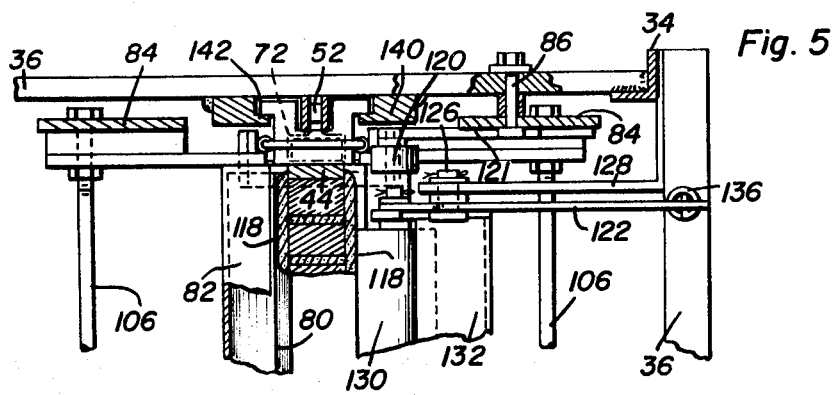
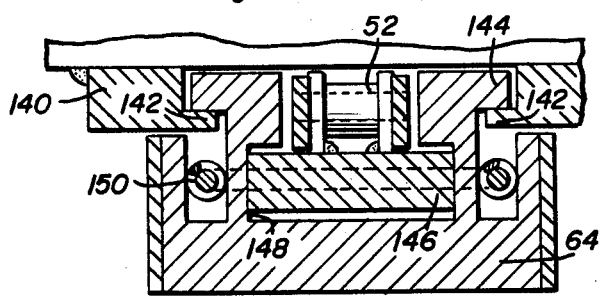
William R. Hettrick
INVENTOR.

United States Patent Office 3,388,409
Patented June 18, 1968

3,388,409
HONEYCOMB UNCAPPING MACHINE
William R. Hettrick, 310 Daly Ave.,
Hamilton, Mont. 59840
Filed Feb. 11, 1966, Ser. No. 526,822
8 Claims. (Cl. 6—12)

ABSTRACT OF THE DISCLOSURE

A machine for uncapping honeycombs including a supply hopper for the honeycombs, means for picking up and feeding the honeycombs between a pair of opposed vertically oriented conveyor chains which have gripping blocks thereon for engaging the honeycombs and moving them downwardly between a pair of reciprocating knives disposed alongside of the path of travel of the honeycombs. An offbearing conveyor is provided at the bottom of the machine for receiving the honeycombs from the conveyor chains.

---

The present invention generally relates to a machine for uncapping honeycombs and more specifically a device for removing the caps of the individual cells of the honeycomb so that the honey may be expeditiously extracted therefrom.

An object of the present invention is to provide a honeycomb uncapping machine which employs a novel conveying apparatus for moving the honeycombs between a pair of knife assemblies for quickly removing the wax cappings from both sides of the honeycomb with the knife assemblies including a pair of reciprocating knives together with means for automatically orientating the knives in proper uncapping relation to the honeycombs so that honeycombs of different thicknesses may be efficiently uncapped by the machine of the present invention.

A further object of the present invention is to provide a honeycomb uncapping machine having a feeding mechanism for holding a plurality of honeycombs in position for discharge into the conveyor which carries the honeycombs between the knife assemblies.

Another important object of the present invention is to provide a honeycomb uncapping machine having an off-bearing conveyor mechanism associated below the conveyor carrying the honeycombs between the knife assemblies for removing the uncapped honeycombs from the area in which the uncapping takes place.

A further object of the present invention is to provide a honeycomb uncapping machine including a vertically orientated conveyor for carrying honeycombs between a pair of reciprocating knives together with a roller assembly for properly orientating the honeycomb and knife assemblies together with steam cleaning means for retaining certain of the components of the machine free of wax, honey and the like.

Still a further important object of the present invention is to provide a honeycomb uncapping machine having a vertically orientated conveyor assembly for moving honeycombs between reciprocating knife assemblies orientated horizontally together with a novel mechanism on the vertical conveyor for securely holding the honeycomb frames in position during the uncapping operation.

Yet a further object of the present invention is to provide a honeycomb uncapping machine which is relatively simple in construction, long lasting and dependable, efficient in operation and relatively inexpensive to manufacture and operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged sectional view of a portion of the structure illustrated in FIGURE 3 illustrating specifically the relationship of the honeycomb to the reciprocating knives and the guide rollers associated therewith;

FIGURE 5 is a detailed sectional view taken along section line 5—5 of FIGURE 4 illustrating further structural details of the guide roller mechanism; and FIGURE 6 is a detailed sectional view taken substantially upon a plane passing along section line 6—6 of FIGURE 4 illustrating further structural details of the conveyor chain and supporting block for the honeycomb.

Figure 1:
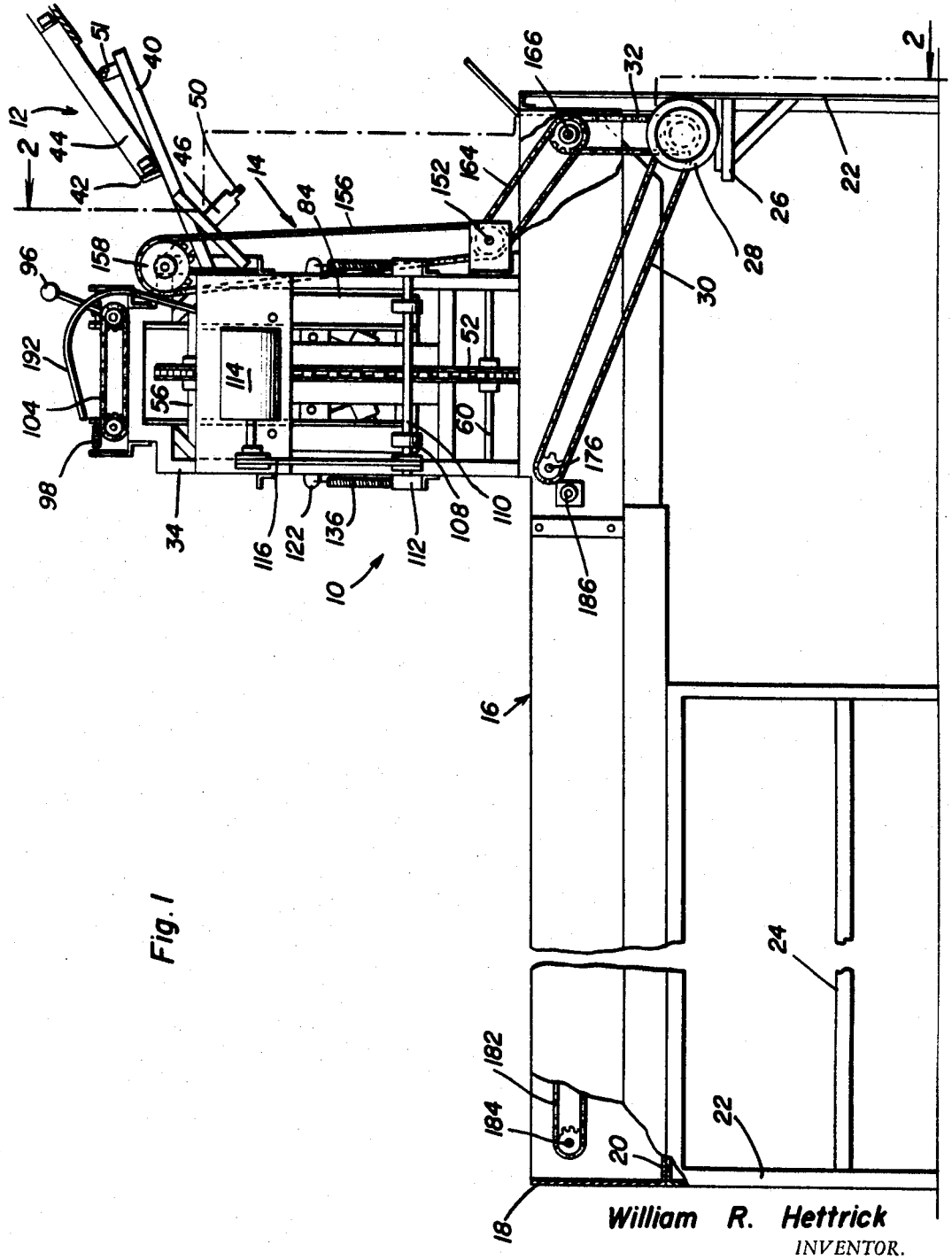
FIGURE 1 is a side elevational view of the honeycomb uncapping machine of the present invention with portions broken away to illustrate the structural details of the drive mechanism.

Referring now specifically to the drawings, the numeral 10 generally designates the honeycomb uncapping machine of the present invention which employs a feed hopper assembly 12, an uncapping assembly 14 and an off-bearing conveyor assembly 16. The entire machine is supported from the off-bearing assembly 16 which is in the form generally of an elongated tray-like structure having an upstanding peripheral wall 18 provided with a bottom 20 which is supported by a plurality of supporting legs 22 provided with suitable bracing 24. The uncapping assembly 14 is disposed adjacent one end of the off-bearing assembly and the supporting legs 22 at this end of the machine are provided with a supporting table or ledge 26 in the form of a bracket for supporting an electric drive motor 28 that drives a sprocket chain 30 and also a sprocket chain 32 for driving components of the invention in a manner described in detail hereinafter.

Figure 2:
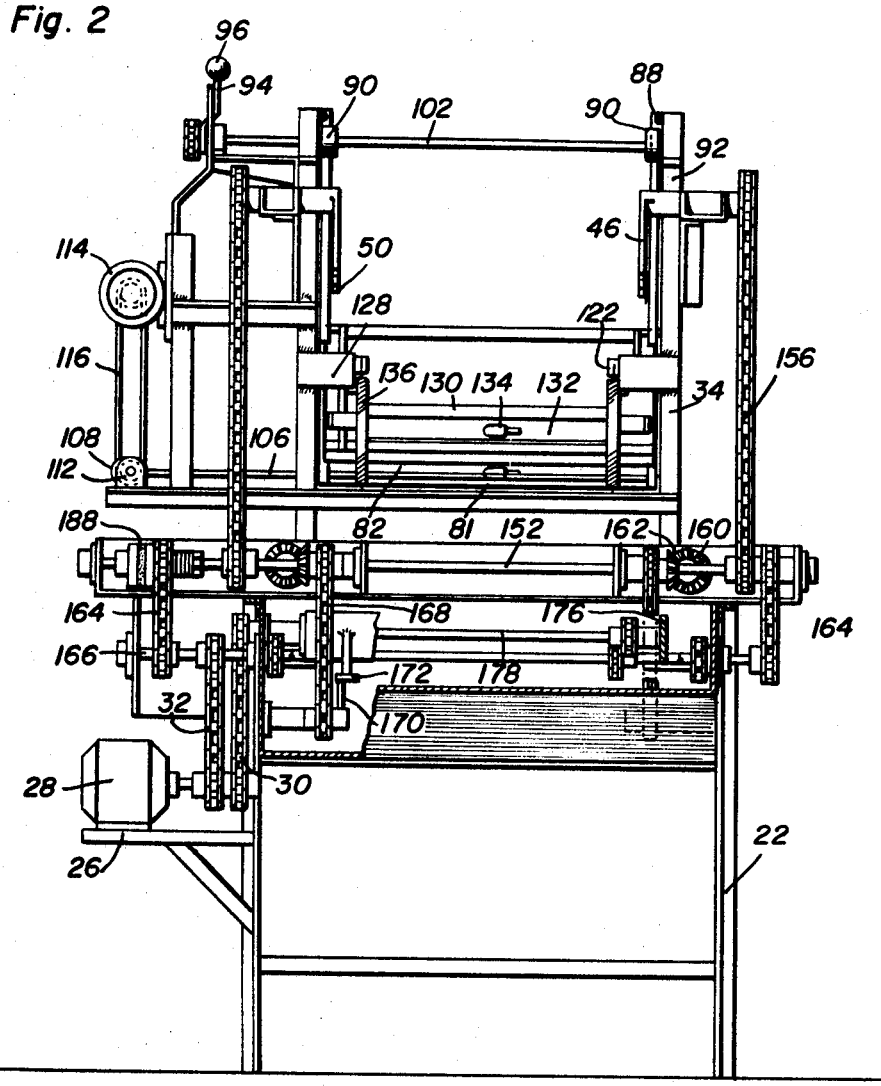
FIGURE 2 is a vertical end view taken generally along section line 2—2 of FIGURE 1 illustrating further structural details of the machine.
Figure 3:
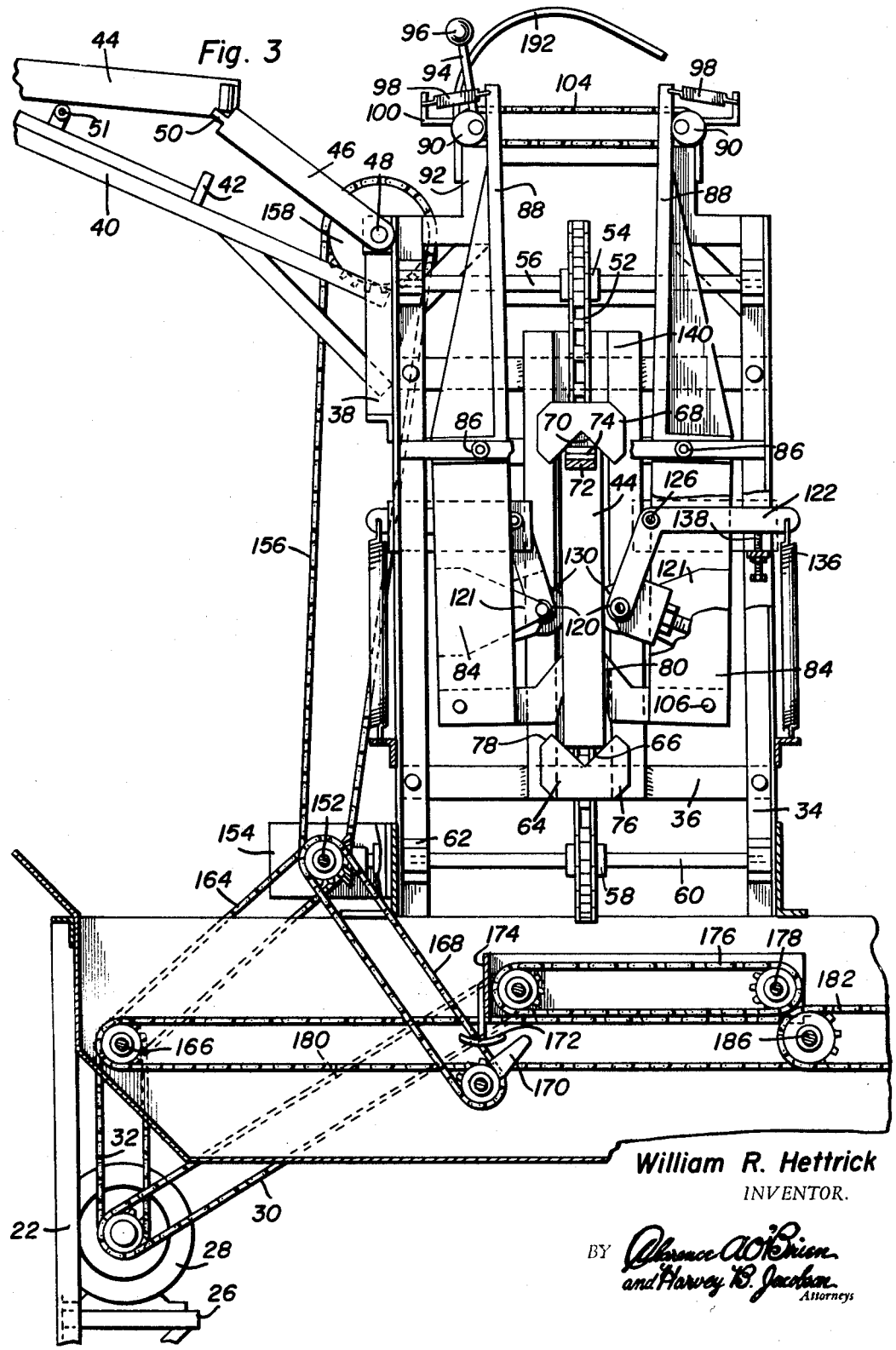
FIGURE 3 is a vertical sectional view through the center of the machine from the opposite side thereof as compared with FIGURE 1.

The cap removing assembly 14 is supported above the tray-like structure and includes upwardly extending corner members 34 interconnected by brace members 36 which may be in the form of strap members or angle iron members in order to form substantially a rigid framework. Brackets 38 are supported from the upper end portions of two of the side members 34 and the brackets 38 support a hopper structure 40 having a stop 42 thereon for engaging and positioning a honeycomb 44 in position for picking up by a pair of arms 46 rotatable with shaft 48 supported on suitable bearings carried by the brackets 38. Each arm 46 is provided with a reduced end portion 50 as illustrated in FIGURE 3 for picking up each honeycomb as the arms 46 are rotated. As illustrated in FIGURE 2, the arms 46 are orientated at opposite sides of the supporting framework with the portion between the arms 46 being free of obstructions so that the arms may rotate in a circular path. The hopper 40 is provided with a connecting rod 51 which stabilizes the entire structure and enables a plurality of honeycombs 44 to be positioned on an inclined support so that as the lowermost honeycomb is removed by the pick-up arms 46 which are rotated in the direction illustrated by the arrows in FIGURES 1 and 3, the next honeycomb will slide into position against the stop 42 thus employing gravity to dispense or feed the honeycombs into the uncapping assembly.

Mounted on the framework adjacent each side thereof is a pair of feed chains 52 which are each entrained over an upper sprocket gear 54 carried by an upper shaft 56 and a lower sprocket gear 58 carried by a lower shaft 60 with the shafts being supported in suitable bearing structures 62.

Each chain 52 is provided with a lower gripping block 64 having a V-shaped notch 66 in the upper surface thereof for engaging the bottom edge portion of a honeycomb frame and centering the same in relation to the chain 52. Also, the chain 52 includes a top upper block 68 which has a downwardly facing V-shaped notch 70 therein for engaging the upper edge of the honeycomb 44. Also, each chain 52 is provided with a dog or lug 72 thereon spaced from the notch 70 for engaging under the projecting lugs 74 on the honeycomb frame for supporting the honeycomb 44 after the lower blocks 64 have progressed around the sprocket gear 58.

A series of pairs of blocks 64 and 68 are provided on each chain 52 and are so timed with the arms 46 so that as a honeycomb 44 is deposited between the chains 52, the lower end thereof will engage the notch 66 and be centered thereon. Then as the block 64 lowers during movement of the chain, the dog 72 and block 68 will engage the honeycomb 44 to securely clamp and retain the honeycomb in position during downward vertical movement thereof.

As illustrated in FIGURES 3 and 4, each of the blocks 64 and 68 includes a camming surface 76 at the lower corner thereof and a camming surface 78 at the upper corner thereof for a purpose described hereinafter.

Disposed on either side of the honeycomb 44 is a knife 80 which has a hollow backing 82 connected thereto and which is mounted on a flat spring steel plate 84 which is sufficiently flexible to enable horizontal reciprocation of the knife 80. Also, the plate 84 is supported from the framework by a pivot pin 86 and an elongated arm 88 extends upwardly from the pivot pin 86 and is engaged by a cam 90 pivotally supported from an upstanding end portion 92 of the frame for rotational movement. A handle 94 provided with a knob 96 is attached to the cam 90 or its shaft in such a manner that pivotal movement of the handle 94 will cause pivotal movement of the cam 90 thus moving the arm 88 inwardly thus pivoting the blades 80 outwardly away from the honeycomb 44. A tension spring 98 interconnects the arm 88 and a bracket 100 for biasing the arm 88 in such a manner to urge the knives 80 towards each other. As illustrated, each of the arms 88 is engaged by a similar cam 90 but the cams remote from the handle 94 are interconnected by a shaft 102 and sprocket chains 104 interconnect the cams on each side of the frame so that all four cams 90 operate in unison for adjusting the initial position of the knives 80 about the pivot pins 86 with the cams 90 moving the knives away from the surface of the honeycomb 44 and the springs 98 urging the knives toward the honeycomb 44 so that the knives 80 can be forced away from the honeycomb by overriding the tension exerted by the springs 98.

For reciprocating the knives 80, the flexible spring steel plates 84 are connected with a connecting rod 106 with the two connecting rods being reciprocated by an eccentric 108 mounted on a shaft 110 journalled on suitable bearings 112 carried by the frame. The shaft 110 is driven from an electric motor 114 and a suitable gear or belt drive 116. Thus, as the motor 114 is operated, it will reciprocate the rods 106 thus reciprocating the knives 80 for more effective cutting or removal of the wax caps 118 on the honeycomb 44.

Mounted adjacent each side of each chain 52 is a cam roller 120 journalled on brackets 121 attached to arms 88 which form an extension of plates 84 that are pivotally supported from the frame by pivot pins 86. The cam rollers 120 engage the cam surfaces of blocks 64 and 68 thus pivoting the spring steel supporting plates 84 and arms 88 about pins 86 thus moving the knives 80 away from the honeycomb 44 when the roller 120 engages the lower cam surfaces 76 and permitting the knives 80 to move towards the honeycomb 44 when the cam rollers 120 engage the cam surfaces 78 thus moving the knives 80 laterally outwardly when the top and bottom portions of the honeycomb frame pass between the knives 80 without damage to the frame but yet permitting the knives to effectively uncap the honeycomb.

A pair of elongated rollers 130 are supported from pairs of generally L-shaped arms 122 each of which has the apex thereof pivotally supported by a pivot pin 126. Each pivot pin 126 is supported by an L-shaped bracket 128 rigidly fixed to frame 34. A hollow chamber 132 is associated with each roller 130 and communicated with a source of steam through a pipe 134 so that the rollers 130 may be retained in a clean condition. The rollers 130 engage the honeycomb and straighten it and retain it in substantially straight condition. Any warpage of the honeycomb will be straightened by the rollers 130. The arm 122 is biased about the pivot pin 126 by a tension spring 136 engaged with the end of the arm 122 and an adjustable stop screw 138 is provided for the arm 122 to limit the inward movement of the rollers thereon. Also, the hollow backing 82 of each knife 80 may be communicated with a source of steam by a conduit 81 for maintaining the rollers and knives in a clean condition.

For guiding the blocks 64 and 68 during their travel between the knives, a track 140 is supported on the framework and includes a pair of inturned ledges 142 slidably guiding and receiving projecting flanges 144 on each of the blocks such as the block 64 illustrated in FIGURE 6. The bottom block 64 is movably mounted on a carrier block 146 which can move relative thereto and which is rigidly fixed to the chain 52. The carrier block 146 is received in a recess 148 and springs 150 extend under the block 64 and are attached at their upper ends to the carrier block 146 for enabling but limiting downward movement of the block 64 thus resiliently gripping the honeycomb 44 for retaining it in vertical position.

The feeder chains 52 and the hopper arms 46 are driven from a main drive shaft 152 journaled in brackets 154. An elongated sprocket chain 156 extends from the shaft 152 to a sprocket gear 158 on each of the shafts 48 thus driving the arms 46. The end of each of the shafts 60 has a bevel gear 160 thereon in meshing engagement with a bevel gear 162 on the main shaft 152. The main shaft 152 is driven from a sprocket chain 164 that is driven from a shaft 166 that in turn is driven from the chain 32.

Also driven from the main shaft 152 is a pair of sprocket chains 168 which drive cam arms 170 which engage a cam follower plate 172 supported on the frame 174 of a high speed off-bearing conveyor 176 which has one end thereof supported for pivotal movement about an end shaft 178 and the other end thereof being vertically elevatable for receiving the honeycombs 44 therebetween with the projection 74 resting on the high speed conveyor chains 176. Rotation of the cam arms 170 will sequentially elevate and lower the end of the high speed off-bearing conveyor chains 176 for receiving the honeycomb therefrom without dropping the honeycomb for any appreciable distance inasmuch as it will not be released until the dog or lug 72 passes under and outwardly of the sprocket gear 58.

The shaft 166 also drives an elongated drive chain 180 which extends to the forward end of a slow speed off-bearing conveyor chain 182 disposed adjacent each side wall of the tray or table-like structure. The chain 180 is engaged with an end shaft 184 and the other end shaft is designated by the numeral 186 thus driving the slow speed off-bearing conveyor chains 182 in such a manner that the honeycombs will be deposited thereon and depend therefrom and be in spaced relation thereon. The sprocket chain 30 extends to and engages the shaft 178 for driving the sprocket chain 176 at a desired high speed.

In the event any of the structure becomes jammed, a friction slip clutch 188 may be provided on the main drive shaft 152 and on any of the other shafts desired.

At the upper end of the supporting framework curved guide members 192 may be provided for preventing accidental engagement with the various gears and chains and wherever desired, sprocket chain covers may be provided to conceal the chains and also tensioning devices may be provided for maintaining the chains at proper tension.

In operation, a plurality of honey containing frames or honeycombs are placed on the hopper so that the edge of the honeycomb having the projecting lugs thereon is uppermost in the gravity feed. This can be accomplished prior to commencing operation of the machine so that the operator placing the honeycombs on the hopper can be ahead of the feeding rate of the machine at all times. Upon operation of the machine, the honeycombs are lifted out of the hopper by the rotating feeder arms 46 which carries them to and sets them down into the spring loaded feeder V-block 64 which is on a downward travel. As the feeder arms 46 lift the honeycombs out of the hopper, the remaining honeycombs in the hopper will slide ahead by gravity and be slanted in the manner illustrated so that one of the honeycombs is ready for the next rotation of the feeder arm thus providing continuous gravity feed.

As the roller block 64 moves downwardly, the top V-block 68 will roll over the upper sprocket gear 54 thus securely locking the honeycomb between the V-blocks 64 and 68. As the chain blocks 64 and 68 travel downwardly, they will be guided positively in a fixed track at the sides of the machine to carry them downwardly in a straight and vertical path so that the honey caps may be cut in a smooth and flat plane. The spring loaded rollers 130 straighten bulged or bellied honeycombs and the cam rollers engage the blocks for increasing the distance between the knives by moving the knives away from each other to allow the honeycomb frame to pass the knives 80 after which the knives are permitted to move inwardly into a set position to cut the caps from the honeycomb. The initial position of the knives is set by the handle 94 and the cams 90 operated thereby. Also, as the honeycomb continues to descend, the upper block 68 engages the cam rollers to move the knives apart so that the upper portion of the honeycomb frame may pass between the knives without damage after which the knives will return to normal cutting position ready for the next honeycomb. The knives 80 can be adjusted by the handle or lever at any time during operation to cut any desired thickness of caps from the honeycombs.

The steam heated roller cleaner and the steam heated knife cleaner will retain the roller and knife clean and free of honey, caps, wax and the like. The knives are preferably constructed of copper material with a copper steam jacket 82 attached thereto. Steel cutting edges are soldered to the copper as one unit to facilitate heat transfer to keep the knife clean.

As the lower block 64 passes under the bottom sprocket, the honeycomb 44 will hang from the dogs 72 and then as the honeycomb passes downwardly, it is released as the blocks 68 roll under the sprocket gear 58. At this time, the high speed off-bearing chain 176 is at a raised position to receive the delivered honeycomb and is immediately lowered to engage a suitable supporting stop thus allowing the honeycomb to move swiftly to the slow speed conveyor chains 182 which move at a relatively slow speed thus allowing a small separation of the honeycombs on the slow speed conveyor chains 182. The honeycombs are easily removed for extracting and the cam roller adjustment is such that at a fixed position, the knives will be allowed to enter the honeycomb depending on the width thickness of the top or bottom of the honeycomb. The high speed conveyor 176 will be elevated at a predetermined time by the cam arm 170 and the cam roller runner 172 for elevating the high speed off-bearing chains 176 to their desired height for receiving the honeycombs at which time the honeycombs are released by the dogs 72.

The bottom V-blocks 64 are spring loaded and adjustable to fit variations of honeycombs which may be normally encountered in commercial practice.

Each side of the machine is substantially identical insofar as the feed chains and blocks for holding the honeycomb are concerned and the control for the knives and the straightening rollers enable the honeycomb to be properly orientated and straightened as it proceeds between the knives and the knives themselves may be adjusted as to the depth of cut and also operated in such a manner that the wax caps will be efficiently removed but the honeycomb frame will not be damaged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A honeycomb uncapping machine comprising a supporting framework, a pair of knife means mounted from the framework and disposed in spaced opposed relation for removing wax caps from both surfaces of a honeycomb when the honeycomb is moved therebetween, means supportingly engaging the honeycomb and moving it between said knife means for removing wax caps, and means for reciprocating each of said knife means in generally a longitudinal direction for increasing the cutting action of the knife means, said means for supporting and engaging the honeycomb including a pair of conveyor chains mounted on said framework and including elongated parallel runs disposed perpendicular to the knife means and outwardly of the opposite ends of the knife means, each of said conveyor chains including at least one pair of gripping blocks for engaging the top and bottom corner edges of the honeycomb, and means for driving said conveyor chains, each of said blocks of said pair having a substantially V-shaped notch in the surface thereof for centering the honeycomb in relation thereto, at least one block of said pair including a carrier block attached to the chain, resilient means interconnecting the carrier block and said one block for grippingly engaging honeycombs of different sizes.

2. The structure as defined in claim 1 wherein said framework includes a pair of opposed tracks disposed outwardly of the parallel runs of said conveyor chains, each of said blocks on the chains including flanges guidingly received in said tracks for stabilizing the blocks and chains when the honeycomb is being moved between the knife means.

3. A honeycomb uncapping machine comprising a supporting framework, a pair of knife means mounted from the framework, a pair of knife means mounted from the framework and disposed in spaced opposed relation for removing wax caps from both surfaces of a honeycomb when the honeycomb is moved therebetween, means supportingly engaging the honeycomb and moving it between said knife means for removing wax caps, and means for reciprocating each of said knife means in generally a longitudinal direction for increasing the cutting action of the knife means, each of said knife means including an elongated knife member, laterally deflectable means supporting said knife members, said means for reciprocating the knife members including eccentric members supported from the framework in a rotational manner, a motor for driving said eccentric members, and connecting rods between the eccentric members and the knife members for reciprocating the knife members, a supply hopper for supporting the honeycombs in an inclined position, and rotatable arms carried by the framework and including means on the outer ends thereof for picking up sequentially the honeycombs and depositing them on the supporting and engaging means.

4. The structure as defined in claim 3 together with off-bearing conveyor means underlying the framework, said off-bearing conveyor means including a high speed conveyor means and a slow speed conveyor means, means elevating one end of the high speed conveyor means in timed relation to movement of the supporting and engaging means for the honeycomb for receiving the honeycombs therefrom and depositing them on the slow speed conveyor means in spaced relation, means driving the high speed conveyor means and slow speed conveyor means and also cyclically elevating a portion of the high speed conveyor means.

5. The structure as defined in claim 4 wherein both the high speed and slow speed conveyor means includes a pair of conveyor chains for supporting the honeycombs in suspended relation therebetween.

6. The structure as defined in claim 1 wherein roller means is supported from the framework in engagement with the honeycomb for straightening and positioning the honeycomb when passing between the knife means, said roller means and knife means including means thereon for heating the same for retaining these components clean and free of wax and the like.

7. The structure as defined in claim 1 together with an adjustable lever means mounted on the framework and operatively connected to the knife means for varying the spatial relation of the knife means for enabling a thin cut or a thick cut according to the thickness of the honeycomb, and means opening the knife means to a spatial relation greater than the adjusted spacing so that wood portions of the honeycomb are permitted to pass between the knife means without damage thereto by temporarily overriding said adjustable means for the knife means.

8. The structure as defined in claim 1 wherein each of said knife means includes an elongated knife member, laterally deflectable means supporting said knife members, said means for reciprocating the knife members including eccentric members supported from the framework in a rotational manner, means for driving the eccentric members, and connecting rods between the eccentric members and the knife members for reciprocating the knife members, said means for supporting and engaging the honeycomb during movement between the knife members including cooperating means engaging a portion of the knife members for moving the knife members away from each other when the lower and upper portions of the honeycomb frame pass therebetween.

References Cited
UNITED STATES PATENTS

| | | | |
|---|---|---|---|
| 2,261,529 | 11/1941 | Stoller | 6—12 |
| 2,272,808 | 11/1942 | McFadyen | 6—12 |
| 2,807,034 | 9/1957 | Fox | 6—12 |
| 3,293,672 | 12/1966 | Gregersen | 6—12 |

LUCIE H. LAUDENSLAGER, *Primary Examiner.*